United States Patent [19]
Wurch et al.

[11] 4,237,611
[45] Dec. 9, 1980

[54] SOLAR SHADOWSCOPE

[76] Inventors: Manuela Wurch, 3, rue Saint Pierre le Jeune, 67000 Strasbourg; Gilbert Cerf, 24, rue Sancey, 25000 Besancon, both of France

[21] Appl. No.: 37,528

[22] Filed: May 9, 1979

[30] Foreign Application Priority Data

May 10, 1978 [FR] France .................. 78 14513

[51] Int. Cl.³ .............................................. G01C 1/00
[52] U.S. Cl. ................................... 33/1 DD; 33/228; 33/271
[58] Field of Search ............. 33/1 DD, 270, 269, 228, 33/271

[56] References Cited

U.S. PATENT DOCUMENTS

| | | | |
|---|---|---|---|
| 1,817,350 | 8/1931 | Clay | 33/1 DD |
| 2,884,697 | 5/1959 | Sylvester | 33/1 DD |
| 3,068,574 | 12/1962 | Bieg | 33/1 DD |
| 4,102,054 | 7/1978 | Lewis | 33/270 |

FOREIGN PATENT DOCUMENTS

216316 11/1909 Fed. Rep. of Germany ......... 33/1 DD
296669 3/1932 Italy ........................................ 33/1 DD

*Primary Examiner*—William D. Martin, Jr.
*Attorney, Agent, or Firm*—Prutzman, Kalb, Chilton & Alix

[57] ABSTRACT

The invention concerns the field of the solar shadowscopes. The apparatus according to the invention is characterized by the fact that the conditions of sunshine are recreated by the displacement of the light source in the relation to the apparatus and that the final position of the light source is given by the real position meeting exactly a given theoretical position of the shadow on the date scale and on the hour scale of a point "T", actually shown by the point of intersection of two wires set in the light beam.

Application to the determination of the shadows on a model.

9 Claims, 3 Drawing Figures

SOLAR SHADOWSCOPE

The object of the present invention is an apparatus allowing the simulation on a model of the conditions of sunshine at a given place, date and hour.

For the architect, and more generally for any professional concerned by the design of a construction or of a set of of constructions, there is a need to take into consideration the position of the shadows and consequently of the light throughout the year, with the greatest attention. Of course, since the question has to be answered before the beginning of the execution; the only possible solution is to simulate these conditions on a model in order to fix the possible modifications to be put in the projects and to adjust them with the greatest accuracy. The problem is therefore of imitating the sunshine conditions at a given place, date and hour. To this end, several methods are already known for allowing the simulation of the sunshine conditions.

Thus the most common process consists in the utilization of solar diagrams set on a plan at a spot with a north-south orientation.

However this process is of a tedious application because a solar diagram is different for each latitude and each day of a year. For the utilization and the realization of a solar diagram, reference can be made to the book "SOLEIL ET ARCHITECTURE" (Sun and Architecture), M. TWAROWSKI Ed. ARKADY, Warsaw (1962/ p 12-26). On the other hand, by reason of the complexity of this process, shadowscope devices such as "heliodon" of the Centre Scientifique et Technique du Batiment (French Scientic and Technical Center of Building) were already proposed. In this apparatus is placed a fixed light source sending out a parallel light beam imitating the sun radiance, and the model to be examined is set on a plate representing the horizontal plan at his spot. Then the plate is moved in order to be set in a given position of the indexes of the scales of latitude, of date and of hour. Though this apparatus give accurate results, its utilization is however limited, owing to its volume and also to its high price which makes it available only to a few practical men. Furthermore, this apparatus is transportable with difficulty and lastly the model itself needs to be moved; that, being in the same time tedious, occasionally does not give a horizontal picture representing the reality.

Therefore, we were led to look for a less expensive apparatus, easily transportable and allowing together an easy and an accurate handling.

According to the invention, the result is achieved through an apparatus allowing the simulation by a model of the sunshine conditions at a given place, date and hour, involving a latitude scale, a date scale, an hour scale and a light source sending out a parallel light beam, similar to the solar radiance, characterized in that the sunshine conditions are imitated by the displacement of the light source in relation to the apparatus, and the final position of the light source is given by the real position meeting exactly a given theoretical position of the shadow on the date scale and on the hour scale of a point "T", actually shown by the point of intersection of two wires set in the light beam.

In fact, the conception of the apparatus according to the invention is based on a different principle, from this used in the existing apparatuses. In fact, here the light source is moved, instead of moving the whole model. In order to simulate the sunshine conditions corresponding to a given place, date and hour, it needs only to make the shadow of a point, actually shown by the intersection of two wires, meeting exactly the position wherein this punctual shadow on the scales of dates and hours must theoretically be set. The coincidence of the theoretical position with the real position of the shadow confirms the exact position of the light source in the space. At this moment, the shadows can be examined directly upon the model.

To this end, in a first time, the apparatus according to the invention and the model must be placed in a thoroughly horizontal way. Consequently an air level or any similar device establishing the horizontality is placed on the basis plate of the apparatus. The basis plate is provided also with adjusting devices of horizontality being able to be operated by hands, for instance by means of feet to be screwed or unscrewed.

The conditions of sunshine at every spot in the world are a function of three parameters that must therefore be reproduced by the apparatus according to the invention, namely the latitude, the date and the sun hour.

The scale of latitude is set in a vertical plan corresponding to the geographic meridian of the place of the survey. This plan must be orientated accordingly and accurately in the north-south direction and therefore this apparatus according to the invention is provided with a North direction, which may be materialized by an arrow placed on the basis plate of the apparatus. The scale of latitude consists of a semi-circle comprising two graduations from 0° to 90°, corresponding the one to the latitudes of the north hemisphere, the other to the latitude of the south hemisphere. The apparatus according to the invention is provided with an index set facing the graduation corresponding to the latitude of the place where it is intended to build what is represented by the model.

The scale of date is obtained considering the apparent movement of the sun on the celestial sphere. The sun, while taking part in the general diurnal motion, has its own particular motion, of a non uniform speed, performed in a plan called "the ecliptic plan" that has an angle of a value of 23°27' from the equatorial plan. The periode of this motion is one year. Combining its own motion with the general diurnal motion, the sun seems following in one year a kind of spherical helix comprised between the two parallels +23°27' and −23°27' away from the equator, as shown by FIG. 1. If, as shown in this figure, the celestial sphere is inscribed in a cylinder of the same diameter and tangential to this sphere along the line of the equinoxes, the apparent paths of the sun can also be traced on this cylinder by means of the simple continuation of the plans of the sun paths. A scale of data is thus obtained, made of horizontal lines distributed parallel to each other, separated by non regular spaces.

By this way, the scale of date of the apparatus according to the invention has been conceived.

Therefore it can be seen that the scale of date should be appearing under the shape of a part of a cylinder with such dimension that the radius R and the height 2 H are related to each other in the ratio $H/R = tg\, 23°27'$. Practically this scale will be put down on a semi-cylinder, by reasons that will appear clearly in the following. The place where we are, the point T, is actually shown in the center of this semi-cylinder by the intersection of two wires stretched between the rims of the cylinder. For a given date, the direction of the sun is therefore materialized by the point T and a point M situated on the straight line of the corresponding scale at this date.

In order to determine the exact position of the point M, it remains only the hour to be taken into account, and the scale of date to be graduated vertically by means of a scale of hour, being considered that in a day the sun will have achieved the complete turn of the celestial sphere with a uniform speed. The semi-cylinder is so graduated from 6 a.m. to 6 p.m. The wanted hour of the observation determines the position of the point M asked for. The principale of the apparatus is the following: when a light beam is allowed to join both point T, place of the observation, and point M, theoretical position of the sun, the accurate direction of the sun rays is then reproduced. Practically, a parallel light beam is sent out to the point T, of which the shadow appearing on the scale of dates and of hours must meet exactly the theoretical point M, fixed by the parameters of the observation point: latitude, date and sun hour. When the coincidence is realized, the conditions of sunshine are exactly reproduced on the model.

For a correct utilization of the apparatus according to the invention, the fact that the sun hour and the legal hour are different is to be taken into consideration. The sun hour is equal to the legal hour, corrected in relationship to the longitude, the equation of time and purely administrative modifyings that change arbitrarily the legal hour (summer hour in some European countries).

The correction of longitude is reckoned on consideration that the sun travels during 4 minutes for each 1 degree of longitude variation, so that, in a given point, a steady correction depending on the longitude of the point must be made to the legal hour in order to get the local apparent hour. In the East of the origin meridian, the correction of 4 minutes per one degree of longitude must be added to the legal hour, whereas it is substracted when in the West of the origin meridian. For the apparatus according to the invention, this correction can algebrically be reckoned and the theoretical position of the point M is taken into account.

Also, it must be taken into account the correction of the equation of time, that is originating in the fact that the movement of the earth around the sun is not uniform. This variation is not depending on the place of observation, and is bound only to the date. This equation is well known and we can also take it easily into account in the theoretical position of point M. We can also provide the insertion into the apparatus according to the invention of a device correcting the equation of time. For instance, this device can be made of an equipment allowing the point T to be lightly decentered.

In its simplest embodiment; the apparatus according to the invention is a very practical working instrument for the survey offices, and every student in architecture can thus possess its own apparatus.

The invention will be better understood by means of the following description of a preferred kind of realization and of appended drawings wherein:

FIG. 1 shows the apparent movement of the sun on the celestial sphere and justifies on a theoretical field the principle of the functioning of the apparatus.

Figure 1:
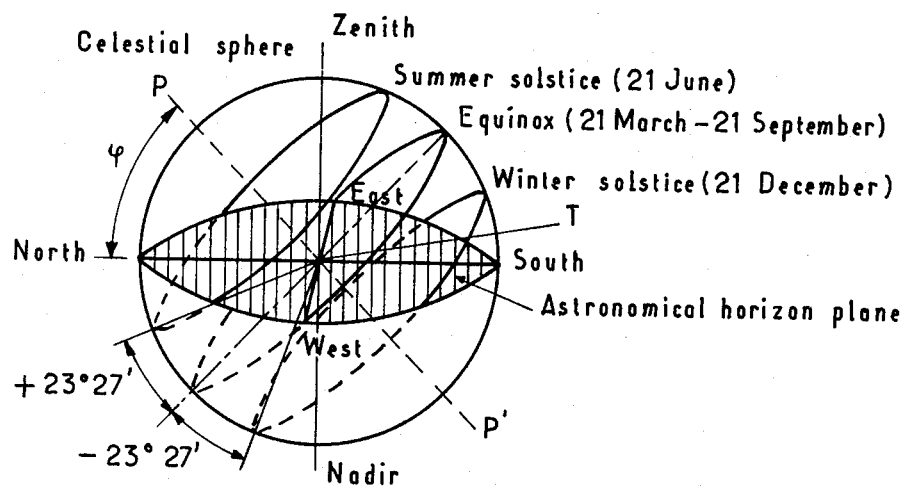
FIG. 1 shows the apparent movement of the sun on the celestial sphere.
Figure 2:
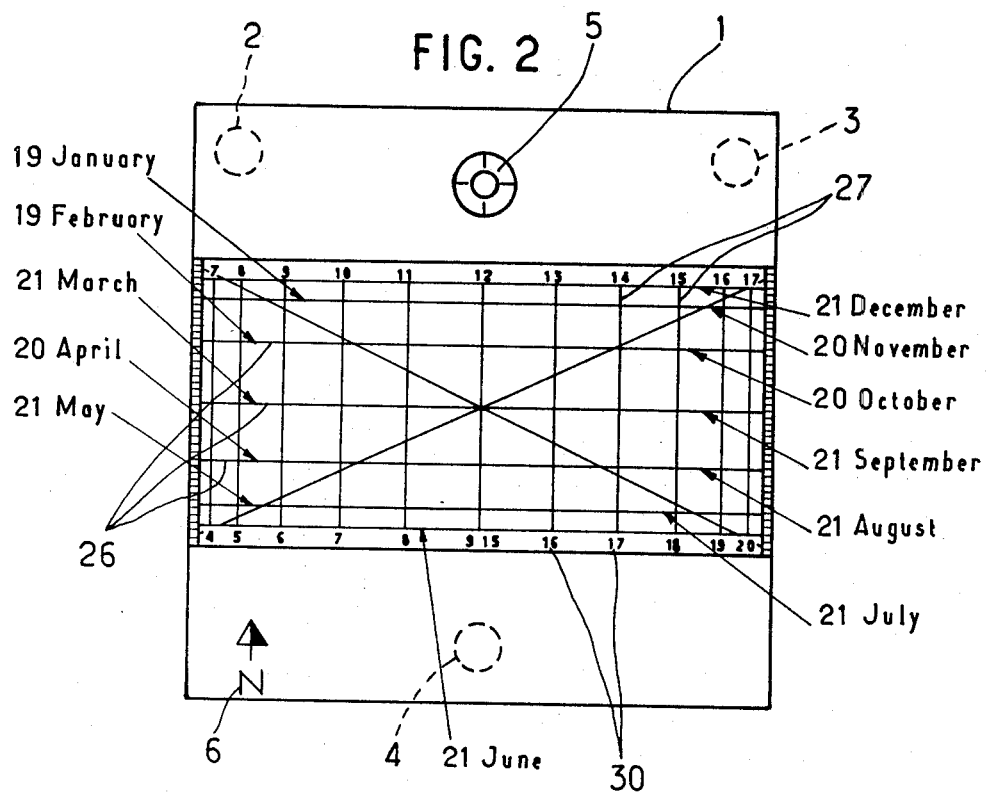
FIG. 2 is a top view of the apparatus according to the invention.
Figure 3:
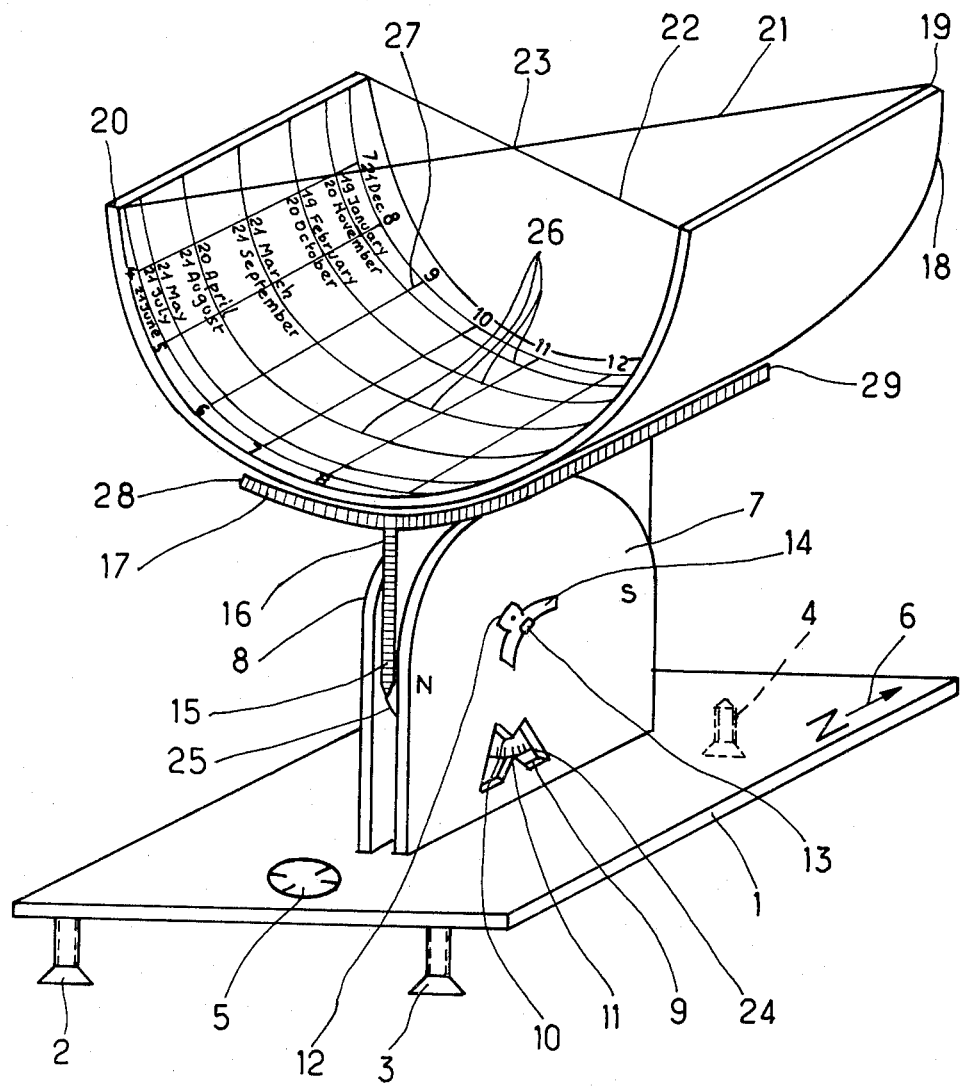
FIG. 3 is a perspective view of the apparatus according to the invention.

The apparatus comprises a base 1, set on adjustable feet 2, 3, 4. The base is provided with an air level 5 and a North indicator 6.

On the base 1 and normal to this, are fixed two flanges 7 and 8 each drilled by a reading window provided with two points 10, 11 facing each other and being used as reading index.

The flanges 7 and 8 are drilled in the center by a hole 12, in which a threaded shaft 13 integral with a butterfly nut 14 enters.

The threaded shaft 13 goes also across the foot 15 of a T shaped cradle 16, of which the receiving part or shoulder 17 is shaped as a part of a cylinder. In this receiving part 17 lays a semi-cylindrical bracket 18. From the corners of the lateral ends 19 and 20 of the bracket 18, two wires 21 and 22 stretch the intersection 23 of which constitutes the point T of the previous description. This point is situated very accurately at the center of the bracket 18.

The scale of latitude 24 is supported by the rounded part 25 of the foot 15 of the cradle 16 and the reading is made through the window 9. It can be provided with the setting of the latitude of the north hemisphere on a face of the part 25 and setting of the latitude of the south hemisphere on the other face.

The date scale 26 is placed on the inner face of the semi-cylindrical bracket 18, just as the scale of hour 27.

Sometimes it is useful to know the conditions of sunshine at hours other than these comprised between 6 a. m. 6 p. m. To this end, it can be foreseen to make the support movable in the relation to the cradle 17. This may be achieved, for instance, by fitting the rims 28 and 29 of the cradle with grooves, along which the cradle 18 can slide. An additional scale of hour 30 is then provided corresponding to the additional positions of working.

The light source, not shown, may be a lamp providing a parallel beam, fitted on a foot, so that it can be moved horizontally and vertically.

The accuracy of the reading of the apparatus according to the invention, is bound to the dimensions of the various scales, with the only restraint that the scale of date and the scale of hour must be set on the inner face of a semi-cylindrical support of radius R and height 2H, such as $H/R = tg\ 23°27'$.

Practically, the operation of the device is as follows:

The apparatus is placed at the rim of the model, orientated according to the north of the model, and the horizontality of the model and of the apparatus is checked;

the cradle is tilted or pivoted around its horizontal axis, so that the latitude of the concerned point can be read through the window, and is locked in this position;

the point M corresponding to the concerned date and hour, is determined on the scale of date and on the scale of hour, taking into account corrections of longitude and of equation of time;

the light source is moved, so that the shadow of the point T meets exactly the point M.

We claim:

1. An apparatus for positioning a sun-simulating light source relative to a model to simulate the sunlight conditions on the model at a given place, date and hour comprising a base positionable adjacent the model in a horizontal plane, a pivotable cradle supported on the base and adapted for being tilted relative to said base to a preselected position corresponding to a given latitude, a semi-cylindrical bracket mounted on said cradle and having a concave inner surface and lateral free ends facing away from said base, reticle wires joining said free ends and intersecting intermediate said ends in spaced relationship to said concave surface, and graph means on said concave surface comprising a date scale extending along a first axis and an hour scale extending along an axis transverse to said first axis whereby the sun-simulating light source can be positioned so that the shadow of the reticle wire intersection is in registry with a point on said graph representing a given date and hour.

2. The apparatus of claim 1 wherein said cradle is provided with a scale of latitude for indicating the tilted position of said cradle.

3. The apparatus of claim 1 wherein the semicylindrical bracket is configured such that H/R = tangent 23°27′ where R is the radius of the bracket and 2H is its useful width.

4. The apparatus of claim 1 wherein said reticle wire intersection is positioned midway between said free ends.

5. The apparatus of claim 1 including level adjustment means for adjusting the horizontal positioning of the base.

6. The apparatus of claim 1 wherein said cradle is of generally T-shaped cross section comprising a vertically extending foot portion and a bracket supporting shoulder portion.

7. The apparatus of claim 6 wherein said shoulder portion is of arcuate semi-cylindrical cross section conforming to said semi-cylindrical bracket for supportably receiving said bracket.

8. The apparatus of claim 6 wherein said shoulder portion is provided with rim means slidably supporting said bracket for adjustable positioning thereon.

9. A process for simulating on a model the sunshine conditions at a given place, date and hour by means of an apparatus for positioning a sun-simulating light source wherein said apparatus is provided with a tiltable semi-cylindrical bracket having a concave inner surface provided with a date and hour scale, the free ends of said bracket being joined by reticle wires intersecting intermediate said ends in spaced relationship to said concave surface comprising the following steps: placing the apparatus adjacent said model, orienting the apparatus according to the North direction of the model and adjusting the horizontality of the apparatus to a plane parallel to the model, tilting the bracket of the apparatus about its horizontal axis so that the bracket is oriented at an angle corresponding to the latitude of the proposed location of the model, and moving the position of the light source so that the shadow of the reticle wire intersection falls on the concave surface of the bracket at the location on the scale thereof of the concerned date and hour.

* * * * *